Dec. 9, 1947.  A. MACKMANN ET AL  2,432,246
SYSTEM OF TOOTHED GEARING
Filed Jan. 8, 1945  2 Sheets-Sheet 1
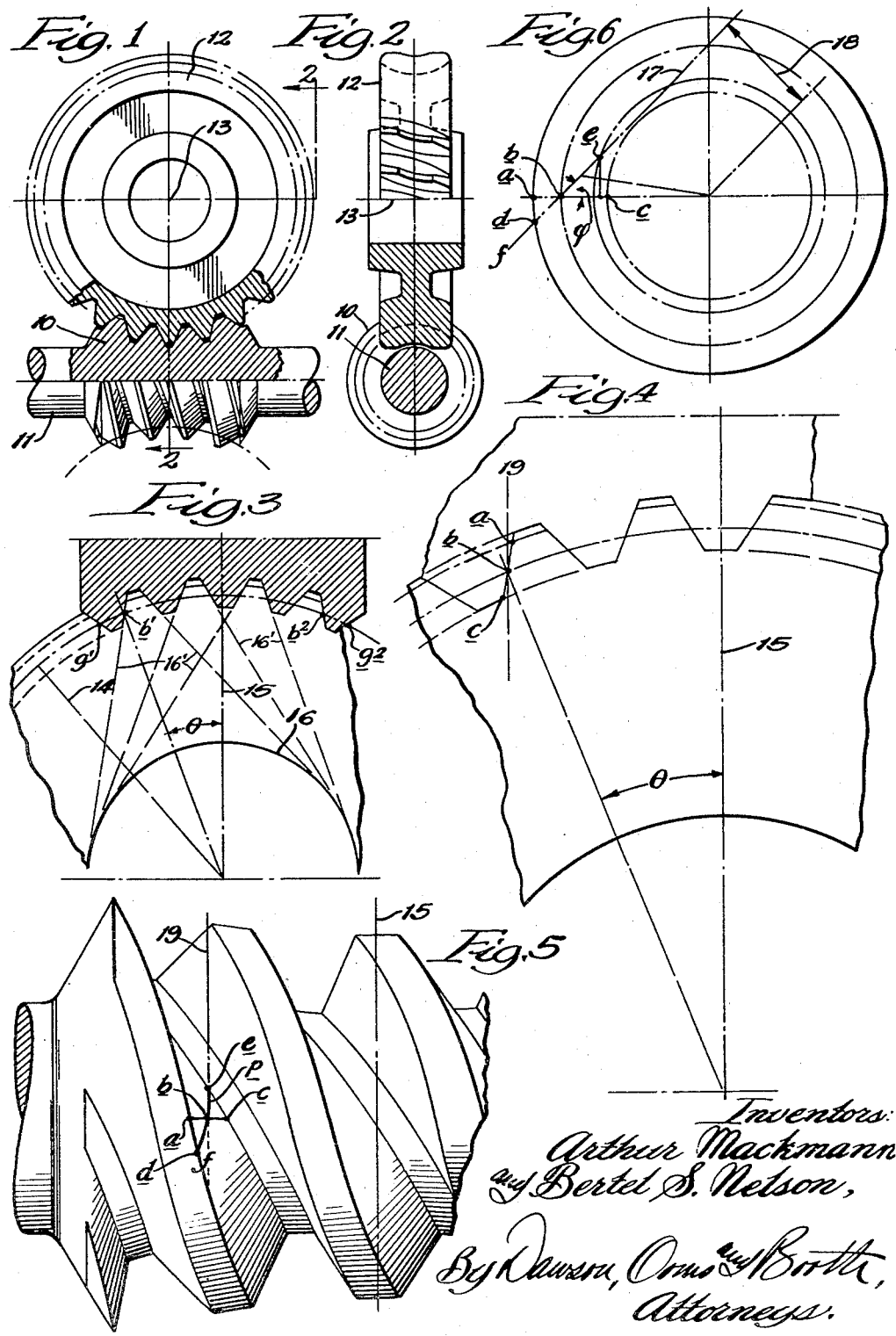
Inventors:
Arthur Mackmann
and Bertel S. Nelson,
By Dawson, Ons & Borth,
Attorneys.

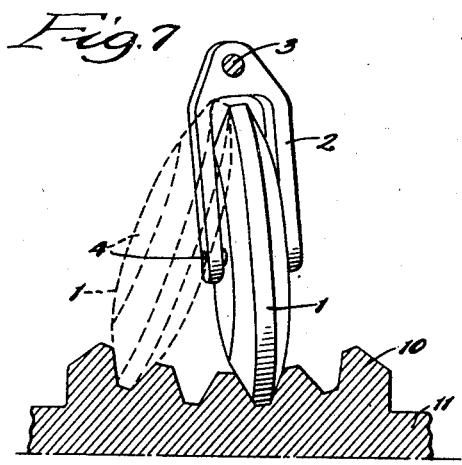
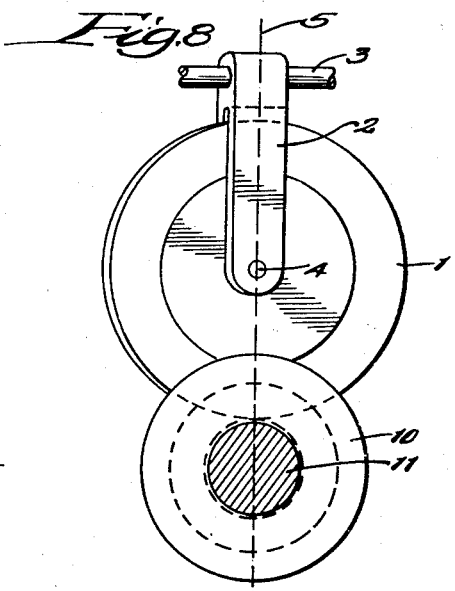
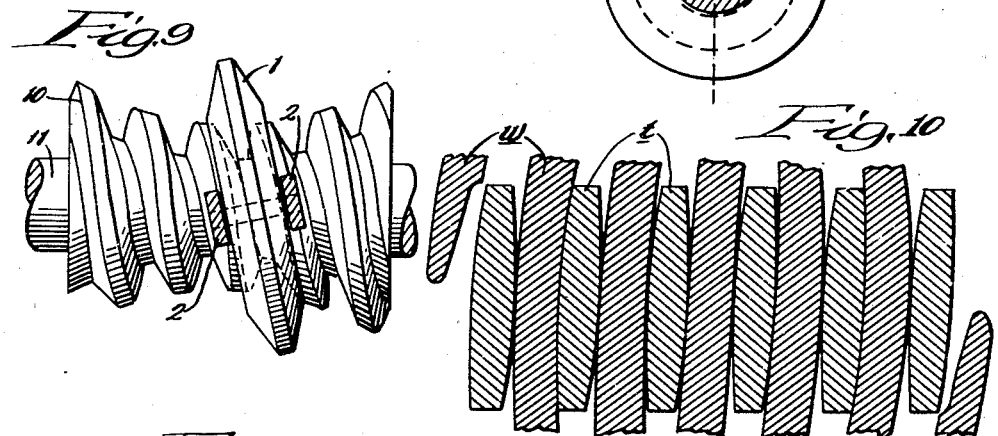
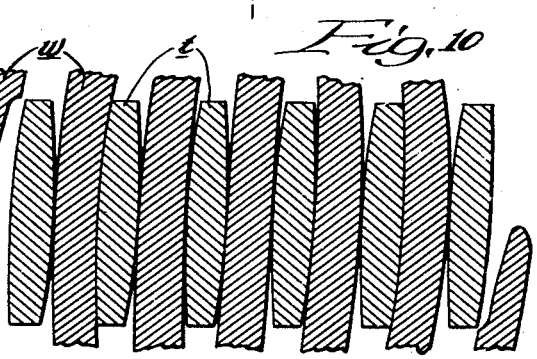

Patented Dec. 9, 1947

2,432,246

UNITED STATES PATENT OFFICE 2,432,246

SYSTEM OF TOOTHED GEARING

Arthur Mackmann and Bertel S. Nelson, Chicago, Ill., assignors to Foote Bros. Gear and Machine Corporation, Chicago, Ill., a corporation of Delaware Application January 8, 1945, Serial No. 571,905

7 Claims. (Cl. 74—458)

1

This invention relates to a system of toothed gearing and more particularly to a system of worm gearing wherein both worm and gear elements partially envelope each other.

The principles of such so called double enveloping gearing are well established and date back to the original Hindley worm and gear. The theoretical advantages of double enveloping or "hourglass" worm gearing over conventional or "cylindrical" worm gearing, are well known. Essentially, the greatest advantage lies in the increased mating surfaces in contact between the worm and gear elements. This increased mating surface contact has the effect of permitting a greater horsepower to be transmitted in a given space or center distance and at a higher transmission efficiency over the comparably sized "cylindrical" worm gear set.

In practice, these advantages have heretofore been offset by several disadvantages including: the expense of special tooling, difficulty of manufacture and assembly, lack of interchangeability, and difficulty of providing hardened and ground worm thread surfaces. The advantages of using hardened and ground worm thread surfaces are well known in the case of cylindrical type worms; logically and by test the same advantages occur in the case of "hourglass" worms. As contrasted to a thread surface soft enough to finish cut, this hardened thread surface produces longer wear life and a higher efficiency by virtue of the lower coefficient of friction present between the gear teeth and the harder, smoother thread surface.

It is one of the objects of this invention to provide a worm gearing system of the double enveloping type wherein both worm and gear elements may be formed accurately and economically with a minimum of specialized tooling.

It is further one of the objects of this invention to provide a worm gear system of the double enveloping type wherein the worm element thread surfaces may be milled and subsequently ground after hardening to a smooth and accurate finish by the use of simple disc type rotary tools similar to those used in the production of cylindrical or involute worms.

It is further one of the objects of this invention to provide a worm gear system of the double enveloping type wherein the gear element can be finished to size by a hob replica of the worm in a straight infeed hobbing process identical to that employed in the manufacture of the more common involute worm gears. This infeed process is well known but may be summarized by stating that the hob is allowed to cut its way into full depth mesh with the gear blank while both are rotating in a timed relationship.

It is further an object of this invention to provide a worm gearing system of the double enveloping type wherein the proportions of worm

2 and gear elements are so controlled as to provide a practical maximum area of thread surface within close proximity to the finished gear tooth surface.

As a result of attaining these objects, the invention provides a worm gearing system of the double enveloping type wherein the gearing elements can be made economically and accurately by simple machining principles.

The above and other objects and advantages of the invention will be more readily apparent from the following description when read in connection with the accompanying drawing, in which—

Figure 1 is a side elevation of a double enveloping worm and gear system with parts in axial section;

Figure 2 is a view at right angles to Figure 1 with parts in section;

Figures 3 to 6 are diagrammatic views illustrating the development of the gearing;

Figure 7 is a view with parts in section illustrating the manner of forming the worm;

Figure 8 is an elevation at right angles to Figure 7;

Figure 9 is a partial plan view of Figure 7; and

Figures 10 and 11 are developed sectional views along the pitch lines of single thread and eight thread worms in mesh with gears.

Because of the varying pitch diameter of the "hourglass" shaped worm, the thread surface inclination to a plane perpendicular to the gear axis and containing the worm axis varies. The complementary angle to this angle of inclination is commonly known as the worm thread helix angle and reaches a maximum value at the center throat section of the worm and a minimum at the ends of the worm. The foregoing and following points are made more clear by reference to Figures 7, 8 and 9. For purposes of discussion, we may assume the thread surfaces to be milled and ground by a rotary type tool such as a grinding wheel 1 mounted on a swingable support 2 whose swinging axis at 3 will agree with that of the mating gear to the worm indicated at 10 to be machined and which further is geared up to turn in the same ratio and direction that the mating gear will turn as the worm is revolved. The wheel axis 4 in the horizontal position lies in a plane 5 perpendicular to the axis of the support rotation and containing the worm axis as seen in Figure 8. The wheel axis is further perpendicular to a radius to the table rotation axis lying in plane 5. If we now tilt the wheel axis around this radius, we may establish an angular setting (Figure 9) which corresponds to the helix angle 2 of the worm at some desired point, and we can mill or grind the worm threads by the timed rotation of the worm and turntable.

It will be seen that the worm thread space produced will equal the space taken by the normal cross-section of the cutter or grinding wheel only at those points where the varying helix angle of the worm agrees with that to which the cutter or grinder axis is set. At any other point along the worm thread the space will be very slightly wider and of a different shape than the normal section of the cutter or wheel since the extreme side edges of the cutter or wheel will cut out material lying beyond its normal section.

In the case of the worm in question the principal effect of this deviation in space width is to produce a varying tooth profile and a varying circular pitch or lead on the worm thread surface in accordance with the helix angle variation. By virtue of this change in tooth profile and lead, contact with the gear teeth surfaces may be decreased, if desired, at points on the worm representing increased lead. In practice, this decrease of contact at the specified points is highly useful if controlled so as to permit contact to be more widely established at other portions of the worm thread surface.

By way of explanation contact is stated as being such close proximity of worm and gear tooth surfaces that the lubricating oil film will enable the surfaces in question to carry load.

The nature of worm thread contact with the corresponding gear teeth in the proposed invention is extremely complex and varies with the particular design proportions of the gear set. It may be briefly stated that in the case of a low helix angle worm as common with high reduction ratios, the greatest portion of the gear tooth surface is contacted by a relatively small portion of the worm thread surface at the point of entrance of the active thread surface into the gear teeth. The entire remaining worm surface contacts the gear teeth at a limited area near the center of the tooth, i. e., near the gear center plane perpendicular to the gear axis and containing the worm axis. In this case the cutter and wheel would best be set to the helix angle at the center of the worm thread in order to increase the contact area of the thread surfaces lying near the center plane of the worm, i. e., near the plane perpendicular to the worm axis and containing the gear axis.

In the case of low ratio gear sets with high helix angles the bearing of the thread surface with the gear teeth is extremely complex. In general it may be stated that a limited portion of the thread surface adjacent the point of entrance of the active thread surface engages half the gear tooth surface on that side of the gear center plane corresponding to where a particular point on the worm surface is passing out of mesh with the gear tooth. The remaining, or first enveloped, half of the gear tooth is contacted by a relatively wide portion of the worm thread adjacent to the worm center plane. In this instance the cutter and wheel could best be set to an average helix angle to promote a greater spread of contact at the favorable center thread portion of the worm.

In the case of intermediate ratios and helix angles the tooth contact patterns will vary in lesser degree from the above discussed. In any event it is possible by mathematical analysis to predict the type of contact that will be obtained for any given gear set of the proposed invention and further select a helix angle and cutter diameter which is best suited to produce the most desirable type of contact for the given gear set. In practice it has been found permissible to utilize wheels and cutters of relatively large diameter and free of the necessity of frequent dressing or resharpening.

In the pursuit of this invention it has further been found that better and more practical contact between worm and gear tooth surfaces occur if the worm length is made considerably shorter than the maximum theoretical length permissible. This maximum permissible length corresponds to a length equal to the hereinafter defined base circle of the gear set, said base circle being in accordance with that established in the original Hindley gear system. The shortened worm reduces the number of teeth in contact with only a minor reduction in the total gear tooth area in contact. The effects of errors in mounting, machining errors and tooth deflections under loads in causing unequal load distribution on the contacting worm and gear teeth is further minimized in the shorter worm because of the lesser number of teeth in contact. In practice this results in a shorter worm having an increased wear life over the full length worm. This is of great importance in power transmission applications since the majority of gears will wear out rather than fail due to mechanical breakage of the teeth.

As a further advantage of decreased worm length, the proportions of worm and gear elements can be so maintained that the gear can be cut to size by an infeeding hobbing process utilizing a full size hob replica of the worm. The obvious advantages of such a method include a simple method of cutting the gears on standard equipment as used for conventional involute worm gears and accurate maintenance of size permissible by the use of a hob replica of the worm.

Figures 1 and 2 illustrate a system of double enveloping gearing employing a worm of the type described above and a mating wheel therefor. As shown in these figures, the worm 10 is carried by a rotatable shaft 11 and the worm teeth mesh with teeth on the wheel 12 which is rotatable about an axis 13. The axis 13 occupies the same relationship relative to the worm as the axis 3 about which the grinding wheel support was pivoted. As best seen in Figure 2, the teeth on the wheel 12 are formed with a curved tooth depth so that they will partially envelope the worm tooth surface.

In the design of a system of gearing of this type the environment in which the gearing is to be used determines a number of the design factors involved. For example, the necessary center distance and number of teeth on the worm and gear are controlled by the desired power to be transmitted and the desired speed ratio. The pitch diameter of the worm at its center must be great enough to provide sufficient rigidity so that the worm will not deflect under load and the worm length is fixed by the desired angle of contact between the worm and the gear. It will be noted in this connection that the worm length can never exceed the diameter of the base circle of the gear set and is preferably less as explained above. The pressure angle is selected to permit substantially standard gear face widths, it being noted that a greater gear face width is permissible when the pressure angle is greater but that a smaller pressure angle is normally more desirable in operation.

From the design factors enumerated above, the pitch diameter of the gear which is equal to twice the radius 14 of Figure 3 is determined and the angle of action equal to twice the angle $\theta$ shown on Figure 4 is fixed. This angle $\theta$ is equal to the angle between the center plane of the gearing indicated at 15 and a plane containing both the gear axis and the point $b$ on the pitch line trace of the worm. The point $b$ is determined by calculation or selection as the extreme point on the pitch line of the inner flank of the worm thread which will first engage a gear tooth as the worm thread moves toward the gear tooth. The worm length is defined as the axial distance between the points $b$ at opposite ends of the gear as indicated at $b'$ and $b^2$ in Figure 3. The actual working length of the worm is from $b'$ to $g^2$ on the opposite flank of the same tooth from $b^2$ or from $b^2$ to $g'$. Location of the point $b$ determines the end pitch diameter of the worm which is equal to twice the distance of the point $b$ from the worm axis. The base circle as indicated at 16 in Figure 3 can also be determined as the circle to which a series of lines as indicated at 16' which are projections of the worm tooth profiles in its axial plan are all tangent. The helix angle of the worm and the tooth depth are also fixed.

From these factors the width of the gear face can be determined. In establishing this width, it is considered that the worm has a profile which is substantially straight sided at the axial section and tangent by extension to the base circle. It will be noted that the tooth profile of such a worm in any plane parallel to but displaced from the axis of the worm will be slightly convex.

The line $a$, $b$, $c$ as shown in Figures 4, 5, and 6 represents the axial profile of the worm thread, the points $a$ and $c$ representing the intersections of an axial plane thru the point $b$ with the tip and working root of the thread. A side plane indicated by the line 19 thru the point $b$ parallel to the center plane will intersect the same worm thread at a point $e$ at the working depth of the thread. The position of the point $e$ will depend, as is apparent, on the helix angle of the thread, the pressure angle, and the worm working root diameter.

A plane as indicated by the line 17 may be passed thru the points $b$ and $e$ parallel to the worm axis and lying at an angle $\varphi$ to the plane $a$, $b$, $c$. This plane, herein called the interference plane, is spaced from the worm axis a distance indicated by the arrow 18 in Figure 6 equal to sine $\varphi \times$ the end pitch radius of the worm. The interference plane 17 will intersect the thread surface along the line $d$, $b$, $e$ which is curved convexly as noted above and as indicated in Figure 5. It is obvious that points on the line $d$, $b$, $e$ which lie outside of the side plane 19, that is away from the center plane, can not create infeed interference but interference will be created by any points on this line lying inside of the side plane, or toward the center plane.

Infeed interference is hereby defined as being that cutting interference which can occur between an improperly designed hob and a gear blank as the hob is fed into full depth mesh with the gear blank. This cutting interference would have the effect of removing metal from the gear tooth surfaces at points where it would subsequently be needed for a full contact with the worm duplicate of the hob.

As will be seen in Figure 5 from the nature of the line $d$, $b$, $e$, all points between $d$ and $b$ necessarily lie outside of the side plane and all points from $b$ to $e$ lie slightly inside of the side plane. It is, therefore, apparent that no infeed interference can occur between the points $d$ and $b$, that is between the hob addendum and the gear dedendum, but that a slight amount of infeed interference only will occur between the points $b$ and $e$, that is between the hob dedendum and the gear addendum, if point $b$ is selected so that the curve formed between $b$ and $e$ approximates a straight line as shown in Figure 5. The maximum infeed interference will occur approximately midway between the points $d$ and $e$ at the point $p$ shown on Figure 5. Due to the nature of the curve $d$, $b$, $e$, after proper selection of $b$, this amount of infeed interference is extremely small and occurs only at the extreme side edges and in the addendum of the gear teeth so that it may be entirely disregarded for all practical purposes.

From the foregoing discussion it can be stated that, for all practical purposes, no infeed interference will occur if the gear face width is limited to a dimension equal to 2 times the distance 18 from the worm axis to the interference plane. In conformance with standard gear design a gear face width of one-third the quantity of the center distance raised to the seven-eighths power, or $$\frac{(C. D.)^{.875}}{3}$$

is desirable. In practice it has been found that if the required width to avoid interference is made not less than 80% of the desired standard width the interferences occurring in the remaining 10% of gear face at each side will be limited to the extreme corner tips of the gear teeth and will be of slight consequence. The gear face width is designed to a required value by proper selection of the pressure angle, in accordance with the inter-relationships of gearing elements discussed.

The nature of the pitch line contact between the worm and gear teeth in a gear set according to the invention having a worm with a single thread providing a 47 to 1 ratio is illustrated in Figure 10. As seen in this figure, the worm thread $w$ may move downward to move the gear teeth $t$ to the right. At the entering end the worm thread will sweep across the gear teeth substantially throughout the full length thereof to provide contact throughout substantially the full pitch line width. Toward the leaving end the worm thread moves out of contact with the gear teeth at their ends but maintains contact in the center plane. It will be noted that each turn of the worm thread contacts a gear tooth so that driving contact is provided throughout the full working length of the worm. The actual contact is substantially the same as that provided by a longer worm of full theoretical length and greater strength is provided in the gear teeth with the present invention than when a full length worm is used.

Figure 11 is a similar view showing the pitch line contact in a gear set having an eight thread worm and providing a 5⅝ to 1 ratio. In this gearing the worm threads at the entering end of the worm contact the gear teeth from a point slightly ahead of the center plane to the leaving ends of the gear teeth. The worm threads move out of contact with the ends of the gear teeth toward the leaving end of the worm but maintain center plane contact throughout the full length of the worm. It will be noted that the nature of the contact is similar to that of Figure 10 except that the angles between the worm and gear tooth surfaces are greater due to the increased helix angles.

The gear as described above can be formed according to substantially conventional machine practice by using a hob which is a replica of the worm. The hob may originally be formed in the same manner as the worm and may then have its tooth flanks notched or grooved to provide cutting edges. A hob of this character can be infed into the gear blank to the full tooth depth in the same manner as with conventional gear hobbing practices and will form in the gear blank teeth which are so shaped that they will mesh properly with the teeth on the worm. It will be noted that during the hobbing operation each of the teeth on the gear is engaged and cut by each of the cutting edges on the hob teeth so that the final shape of the gear teeth will be determined by a composite of the several curves produced by the sweep of different portions of the hob teeth across the gear blank. This will produce a shape on the gear teeth which will contact with the worm teeth during operation in the manner above described to produce contact throughout the full length of the worm. However, because of the variation in pitch of the worm teeth, as described above the contact area at the extreme ends of the worm is generally less than that at other portions of the worm so that the worm teeth have a smooth entering engagement with the gear teeth to provide a smooth even operation. This feature also provides for better flow of lubricant between the engaging surfaces of the worm and gear teeth and assists in maintaining lubricant film.

While one embodiment of the invention has been shown and described herein in detail, it will be understood that this is illustrative only and is not intended as definition of the scope, reference being had to the appended claims for this purpose.

What is claimed is:

1. A system of gearing comprising a worm of the hour glass type and an intermeshing toothed wheel, the wheel having an effective width which is equal to the end pitch diameter of the worm times the sine of the angle between a plane parallel to the axis of the worm and intersecting points on a worm thread flank which are equidistant from the center plane of the worm and which lie respectively on the pitch line trace of the worm and at the working depth of the worm thread and a second plane thru the worm axis and the first named of said points.

2. A system of gearing comprising a worm of the hour glass type and an intermeshing toothed wheel, the width of the wheel face being not substantially greater than the effective width of the wheel and the effective width of the wheel being equal to the end pitch diameter of the worm times the sine of the angle between a plane parallel to the axis of the worm and intersecting points on a worm thread flank which are both spaced from the center plane of the worm an amount equal to one-half the effective worm length and which lie respectively on the pitch line trace of the worm and at the working depth of the worm thread and a second plane thru the worm axis and the first named of said points.

3. A system of gearing comprising a worm of the hour glass type having a tooth thereon whose profile at the axial section is essentially straight sided and a wheel having peripheral teeth thereon to mesh with and envelop the worm tooth, the width of the wheel face being not substantially greater than its effective width and its effective width being equal to the end pitch diameter of the worm times the sine of the angle between a plane parallel to the axis of the worm and intersecting points on a worm thread flank which are equidistant from the center plane of the worm and which lie respectively on the pitch line trace of the worm and at the working depth of the worm thread and a second plane thru the worm axis and the first named of said points.

4. A system of gearing comprising a worm of the hour glass type and a wheel having teeth thereon meshing with the worm, the worm having a length less than the diameter of the base circle of the gearing and having a tooth thereon whose pitch varies lengthwise of the worm, the wheel having an effective width which is equal to the end pitch diameter of the worm times the sine of the angle between a plane parallel to the axis of the worm and intersecting points on a worm thread flank which are equidistant from the center plane of the worm and which lie respectively on the pitch line trace of the worm and at the working depth of the worm thread and a second plane thru the worm axis and the first named of said points.

5. A system of gearing comprising a worm of the hour glass type and a wheel having teeth thereon meshing with the worm, the worm having a hardened tooth thereon whose flanks are so shaped that they lie tangent at all points to the peripheral faces of a wheel having a radially tapering periphery which is swung about an axis at the wheel axis and whose angle relative to said axis is unchanged.

6. A system of gearing comprising a worm of the hour glass type and a wheel having teeth thereon meshing with the worm, the worm having a tooth thereon which is essentially straight sided at the axial section and whose pitch varies lengthwise of the worm, the wheel having an effective width which is equal to the end pitch diameter of the worm times the sine of the angle between a plane parallel to the axis of the worm and intersecting points on the worm tooth flank which are equidistant from the center plane of the worm and lie respectively on the pitch line trace of the worm and at the working depth of the worm thread and a second plane through the worm axis and the first named of said points.

7. In a system of gearing, a worm of the hour glass type having a thread thereon which is essentially straight sided in axial section and whose contour varies from end to end of the worm so that the thread flanks will lie tangent at all points to the peripheral faces of a wheel having a smooth radially tapering periphery swung about an axis spaced from the worm axis and at an angle to a plane through the worm axis while maintaining the angle of the wheel constant relative to the first mentioned plane.

ARTHUR MACKMANN.
BERTEL S. NELSON.

REFERENCES CITED

The following references are of record in the file of this patent:

UNITED STATES PATENTS

| Number | Name | Date |
|---|---|---|
| 1,746,722 | Trbojevich | Feb. 11, 1930 |
| 1,822,800 | Cone | Sept. 8, 1931 |
| 2,279,414 | Scott | Apr. 14, 1942 |